United States Patent [19]

Abe

[11] Patent Number: 5,511,591
[45] Date of Patent: Apr. 30, 1996

[54] METHOD AND DISPENSER FOR FILLING LIQUID CRYSTAL INTO LCD CELL

[75] Inventor: Taizo Abe, Himeji, Japan

[73] Assignee: Fujitsu Limited, Kawasaki, Japan

[21] Appl. No.: 419,546

[22] Filed: Apr. 10, 1995

Related U.S. Application Data

[62] Division of Ser. No. 344,668, Nov. 22, 1994, which is a division of Ser. No. 134,715, Oct. 12, 1993, Pat. No. 5,406,989.

[30] Foreign Application Priority Data

Apr. 13, 1992 [JP] Japan .................................. 4-118459
May 8, 1992 [JP] Japan .................................. 4-142054

[51] Int. Cl.⁶ .............................. B65B 31/00; B67C 3/00
[52] U.S. Cl. ..................................... 141/7; 141/4; 141/31; 141/65
[58] Field of Search ........................ 141/4, 7, 59, 31, 141/63, 65, 1; 156/99, 103, 104, 106, 107

[56] References Cited

U.S. PATENT DOCUMENTS

| | | | |
|---|---|---|---|
| 1,922,458 | 8/1933 | Schaeffer | 141/31 |
| 4,099,550 | 7/1978 | Matsuzaki | 141/51 |
| 4,441,532 | 4/1984 | Hrubesh | 141/1 |
| 4,597,421 | 7/1986 | Wells | 141/5 |
| 4,753,276 | 6/1988 | Inaba | 141/7 |
| 4,922,972 | 5/1990 | Watanabe | 141/4 |
| 5,010,930 | 4/1991 | Columbus | 141/1 |
| 5,029,623 | 7/1991 | Brosig | 141/7 |
| 5,269,351 | 12/1993 | Yoshihara | 141/7 |
| 5,281,450 | 1/1994 | Yaniv | 156/99 |

Primary Examiner—Henry J. Recla
Assistant Examiner—Steven O. Douglas
Attorney, Agent, or Firm—Armstrong, Westerman, Hattori, McLeland & Naughton

[57] ABSTRACT

Methods and dispensers which are used for filling liquid crystal into a LCD cell. The methods use a liquid crystal dispenser able to release liquid crystal with sufficient controllability at an evacuated atmosphere. Liquid crystal is filled through an inlet of an assembled LCD cell, or filled by laminating an upper substrate with a lower substrate on which liquid crystal has been dropped. The invented liquid crystal dispensers have an opening, in addition to the opening for a capillary, through which interior air bubbles can be released out so as not to be released from the capillary.

3 Claims, 8 Drawing Sheets

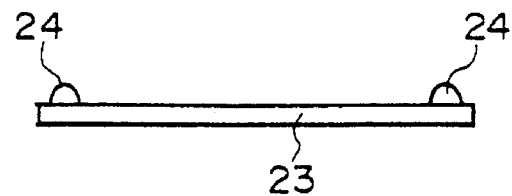
FIG. 8(a)
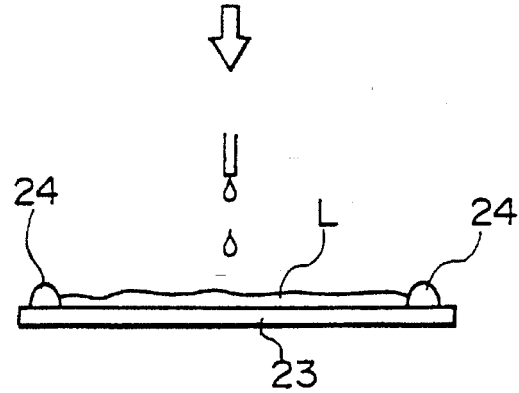
FIG. 8(b)
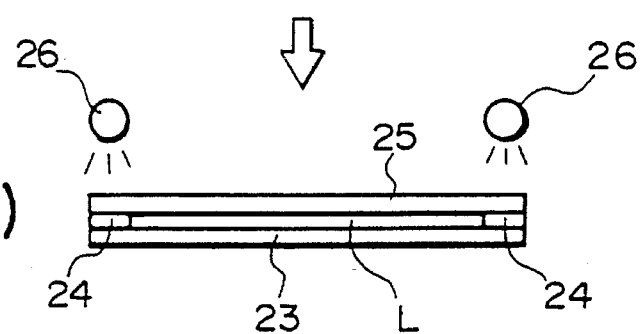
FIG. 8(c)
FIG. 9
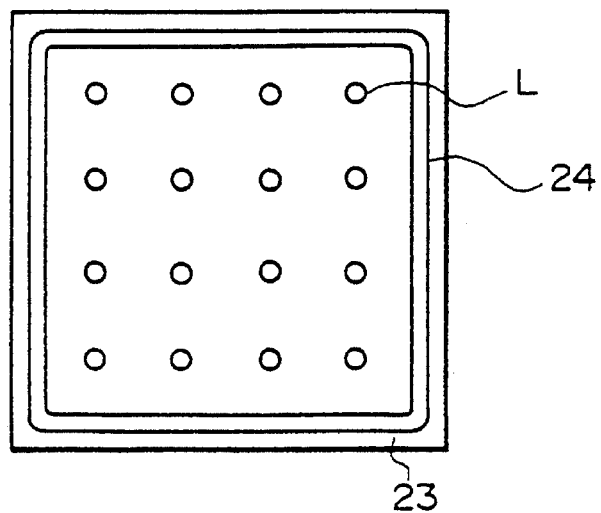

METHOD AND DISPENSER FOR FILLING LIQUID CRYSTAL INTO LCD CELL

This is a Divisional application of Ser. No. 08/344,668, filed Nov. 22, 1994, which is a Divisional application of Ser. No. 08/134,715, filed Oct. 12, 1993, now U.S. Pat. No. 5,406,989.

BACKGROUND OF THE INVENTION

This invention relates to fabrication of liquid crystal display (LCD), more specifically, to a filling step of liquid crystal into a LCD cell.

LCDs have, as well-known, an arrangement where liquid crystal is filled in a LCD cell which is assembled with a couple of transparent substrates facing each other. Transparent electrodes are formed on the interior surfaces of those substrates and voltage applied on those electrodes can alter molecular configuration, resulting in forming an image to be displayed.

There is, therefore, a filling step of liquid crystal in the LCD fabrication process. A LCD cell is preliminary assembled by laminating two pieces of substrate. Those substrates are pasted on those margins except for a part for an inlet for filling. Liquid crystal is filled through the inlet into the interspace of two substrates.

FIG. 11 explains a conventional way of filling liquid crystal. This way uses the capillary phenomenon. A bucket 1 in which liquid crystal is pooled is provided in a vacuum chamber and the inlet of LCD cell 2 is dipped into the liquid crystal so that liquid crystal is absorbed up into LCD cell 2 by the capillary phenomenon. After filling, the inlet is sealed with resin.

SUMMARY OF THE INVENTION

On the conventional filling way described above, liquid crystal pooled in the bucket can not be used up completely because of residue on the bucket bottom. Residual liquid is disposed of, which may cause cost increase. Particularly for recent liquid crystal materials developed for higher performances, which are usually expensive, a large amount of waste liquid may contribute greatly to cost increase.

Further, on the conventional way, because the surface of pooled liquid crystal is exposed to an evacuated atmosphere in the vacuum chamber for long time, problem that some constituents of liquid crystal may evaporate to deteriorate the quality of liquid crystal becomes serious if high-evaporative liquid is employed.

The first object of the invention is to solve such a problem by presenting a new way of filling, which enables cost cutting by reducing an amount of waste liquid crystal and brings no liquid deterioration caused by the constituent evaporation.

Furthermore, the conventional way needs so long time to fill up the cell with liquid crystal because it uses the capillary phenomenon. It sometimes takes twenty or thirty minutes. This can be a stumbling block for productivity improvement in LCD manufacturing.

The second object of the invention is to solve such a problem, that is, to reduce the filling time in order to contribute to productivity advancement.

On the other hand, in the field of liquid dispensers that includes another subject of the invention, many kinds of dispensers having a needle such as injectors or syringes are well-known. As for industrial use, dispensers fop filling insulating oil into precision transformers ape known. However, any dispenser which can be operated at an evacuated atmosphere in a vacuum chamber has not been developed.

Inventor made an examination of liquid filling at an evacuated atmosphere using a conventional dispenser. Then, it was found that the stroke of the piston and an amount of released liquid do not have enough correspondence and liquid release with enough controllability is impossible. Inventor investigated the cause of this, then found that air bubbles are formed in the dispenser and released from the needle.

The third object of the invention, which is brought by this new acknowledgment, is to present liquid crystal dispensers which can be operated at an evacuated atmosphere with enough controllability, avoiding a problem caused by such gas release.

To accomplish the above objects, this invention, at first, provides a method for filling liquid crystal into a LCD cell, which is executed by a liquid crystal dispenser able to be operated at an evacuated atmosphere with enough controllability and comprises steps of placing the LCD cell at an evacuated atmosphere setting an inlet of the LCD cell upward, releasing the predetermined amount of liquid crystal from the dispenser thus filling into the cell, and then sealing the inlet.

The invention also provides a method fop filling liquid crystal into a LCD cell, which is executed by a liquid crystal dispenser able to be operated at an evacuated atmosphere with enough controllability and comprises steps of placing a lower substrate horizontally at an evacuated atmosphere, releasing the predetermined amount of liquid crystal from the dispenser onto the lower substrate, laminating a upper substrate on the lower substrate, and sealing those margins.

The invention also provides a preferred mode of the above methods using a liquid crystal dispenser able to release drop by drop and able to control the quantity of one drop, which is performed controlling the number of drops.

Furthermore, the invention also provides a liquid crystal dispenser for filling liquid crystal into a LCD cell at an evacuated atmosphere, which comprises a vessel, a capillary connected with the vessel, a piston transferring liquid crystal from the vessel into the capillary, and an opening formed on the vessel in addition to an opening for connecting the capillary, whereby the surface of stored liquid crystal is exposed to the evacuated atmosphere through the additional opening.

BRIEF DESCRIPTION OF DRAWINGS

FIGS. 8a–8c explains the second embodiment of the liquid crystal filling method of the invention.

FIG. 9 is a plane view of lower substrate in the second embodiment of the liquid crystal filling method.

DETAILED DESCRIPTION OF THE INVENTION

Preferred embodiments of the invention are described in detail as follows.

Figure 1:
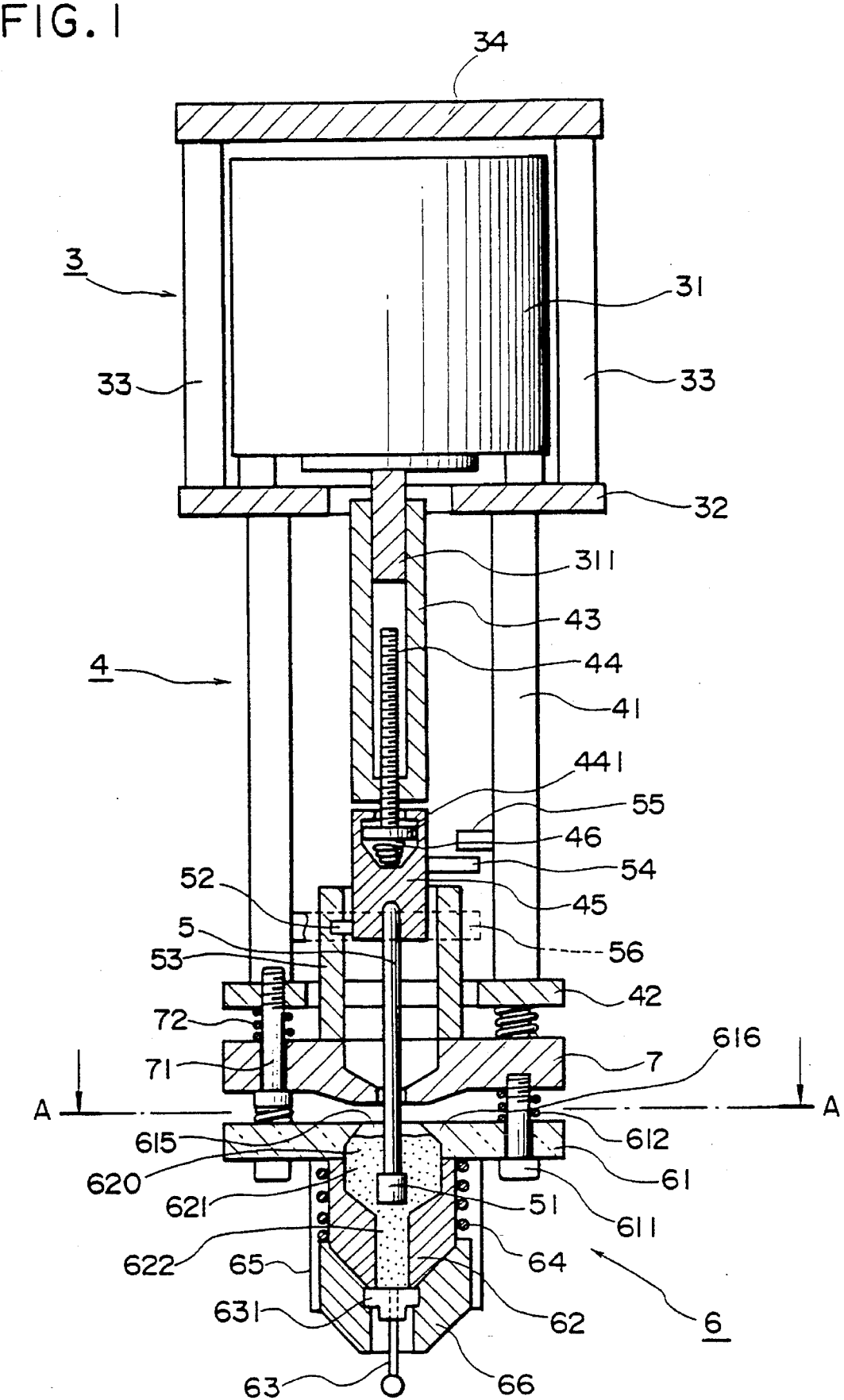
FIG. 1 is a schematic cross-sectional view of a liquid crystal as one embodiment of the invention.

At first, an embodiment of the liquid crystal dispenser of the invention is described. The liquid crystal dispenser shown in FIG. 1 is mainly composed by actuator 3, motion transformer 4 provided beneath actuator 3 to transform the rotation motion put out from actuator 3 into a linear up-and-down motion, piston 5 provided beneath motion transformer 4 to carry liquid crystal by its up-and-down motion transferred from transformer 4 and capillary unit 6 provided beneath piston 5 to release liquid crystal by the up-and-down motion of piston 5. Capillary unit 6 has vessel 62, and is easily fitted and removed for substitution as described later.

Actuator 3 is assembled by motor 31, base board 32 on which motor 31 is fixed, strut 33 fixed uprightly on base board 32, upper board 34 fixed on the top of strut 33. Base board 32 has a center hole through which the output rod 311 of motor 31 is inserted downward. On upper board 34, a mount (not shown) which is fitted with a dispenser holder in the liquid filling apparatus is fixed. Any kinds of motors, for example a stepping motor, can be used as motor 31.

Detailed composition of motion transformer 4 is as follows. Three struts 41 are fixed down on the under surface of base board 32 and mean base board 42 is fixed horizontally on the bottom of struts 41. Motion transformer 4 is provided among those three struts 41, and is mainly composed by rotation cylinder 43 which upper opening is thread-fixed with output rod 311 of motor 31, slave threaded rod 44 which moves up-and-down by rotation of rotation cylinder 43, piston holder 45 holding the top of piston 5 to transfer the up-and-down motion of slave threaded rod 44 to piston 5.

Rotation cylinder 43 has a slender shape as shown and has the bottom portion at which a threaded hole is formed. Slave threaded rod 44 is a round rod which round surface is threaded and thread-connected with the threaded hole at the bottom portion of rotation cylinder 43. The bottom of slave threaded rod 44 is stuck down out of rotation cylinder 43. Piston holder 45 beneath rotation cylinder 43 is in the shape of a short column and has a hollow space at its upper side as shown. Trough-hole is formed at the upper surface of piston holder 45 and the bottom of slave threaded rod 44 is inserted through the through-hole into the hollow space of piston holder 45. Rod head 441 in shape of a round board is fixed at the bottom of slave threaded rod 44. Beneath rod head 441, coil spring 46 is provided in the hollow space. Coil spring 46 has comparatively high rigidity and acts as a rigid body which transfers the up-and-down motion of slave threaded rod 44 directly to piston 5 when this liquid crystal dispenser is operated. Coil spring 46 is employed for an accident in case that piston head 51 deviates and knocks at the inlet of ejecting space 622.

Piston 5 is fixed down on the under surface of piston holder 45 by confining its top into the piston holder 45. Piston 5 has a piston head 45 in a shape of column having a slightly large diameter, and has an antirotation pin 52 and sensing blade 54 provided at the side. On the other hand, antirotation cylinder 53 is fixed uprightly on unit base board 7, and origin sensor 55 and overrun sensor 56 are provided at strut 41.

Under mean base board 42, unit base board 7 is fitted by three base fitting pins 71. Each top of base fitting pins 71 is thread-fixed down on mean base board 42 and each base fitting pin 71 penetrates through out of unit base board 7. Pin coil spring 72 is provided around each board fitting pin 71. Unit base board 7 is sustained at the distance down from mean base board 42 by pressing down of pin coil spring 72. Both mean base board 42 and unit base board 7 have a center hole where piston 5 is inserted.

Capillary unit 6 is provided beneath unit base board 7 described above and is composed mainly by vessel holding board 61 which is sustained down on unit base board 7 in away easy to fit and remove, liquid storing vessel 62 fixed on the under surface of vessel holding board 61 and capillary 63 fixed at the bottom of vessel 62.

Vessel holding board 61 is sustained by unit base board 7 in similar way as in unit base board 7 by mean base board 42. That is, three board fitting pins 611 around which pin coil spring 612 is provided in each are thread-fixed down on unit base board 7 at the top and penetrates through out of vessel holding board 61, thus sustaining vessel holding board 61 by pressing down of pin coil spring 612. Mean base board 42, unit base board 7 and vessel holding board 61 are all in shapes of a round board, and three base fitting pins 71 and three board fitting pins 611 both form equilateral triangles for well-balanced sustenance. The triangle by three base fitting pins 71 and the triangle by three board fitting pins 611 deviate from each other in order not to interfere.

Vessel 62 has two openings, that is, upper opening 620 and bottom opening where capillary 63 is fixed. Vessel holding board 61 also has a little large center hole 615 and the upper edge of vessel 62 is fixed surrounding center hole 615 of vessel holding board 61. Liquid crystal can be poured through center hole 615 and upper opening 620 into vessel 62. Poured liquid crystal accumulates in vessel 62 and the liquid surface gets in contact with an evacuated atmosphere through center hole 615 and upper opening 620. Aperture 616 is formed along the inside of center hole 615 for making the opening narrower in order to prevent liquid crystal from scattering out of vessel 62. Vessel 62 has a cross-sectional configuration shown in FIG. 1, where the inner diameter at the upper part is larger than the lower part. The upper part is storing part 621 and the lower part is ejecting part 622. The inner diameter at ejecting 622 part is almost the same as the outer diameter of piston head 51, though a small clearance remains for insertion of piston head 51.

Capillary 63 is made of metal similar to needles and has capillary mount 631 at the base. Capillary mount 631 is fixed at the bottom opening of vessel 62 and the fixing part is sealed by an O-ring or other sealing parts. Heater 64 is provided around on the outer surface of vessel 62 in order to heat the interior liquid crystal. For example, a linear sheath heater can be adopted as heater 64. Capillary unit 6 yet has other parts such as outer cover 65 and protection cylinder 66 for protecting capillary 63.

Next is described the operation of this liquid crystal dispenser. Liquid crystal to be released from capillary 63 is poured into vessel 62 to be stored prior to operation. Pouring may be done using a tube or pipe. It is also possible and easier to pour after removal of vessel holding board 61 from unit base board 7. Stored liquid crystal is heated by heater 64 around vessel 62 up to a predetermined temperature, for example, 100 degree or below.

Original position of piston 5 is the upper marginal position at convenience for explanation. At this position, piston head 51 is place in storing part 621 of vessel 62. And, this position is sensed by origin sensor 55.

Initially, a drive signal is sent from a control device (not shown) to motor 31. Consequently, rotation cylinder 43 starts rotation, driven by output rod 311. Rotation motion of rotation cylinder 43 is transferred to slave threaded cylinder 44, resulting in that slave threaded cylinder 44 moves upward or downward according to the orientation of rotation, because rotation motion is restrained by as described next.

Figure 2:
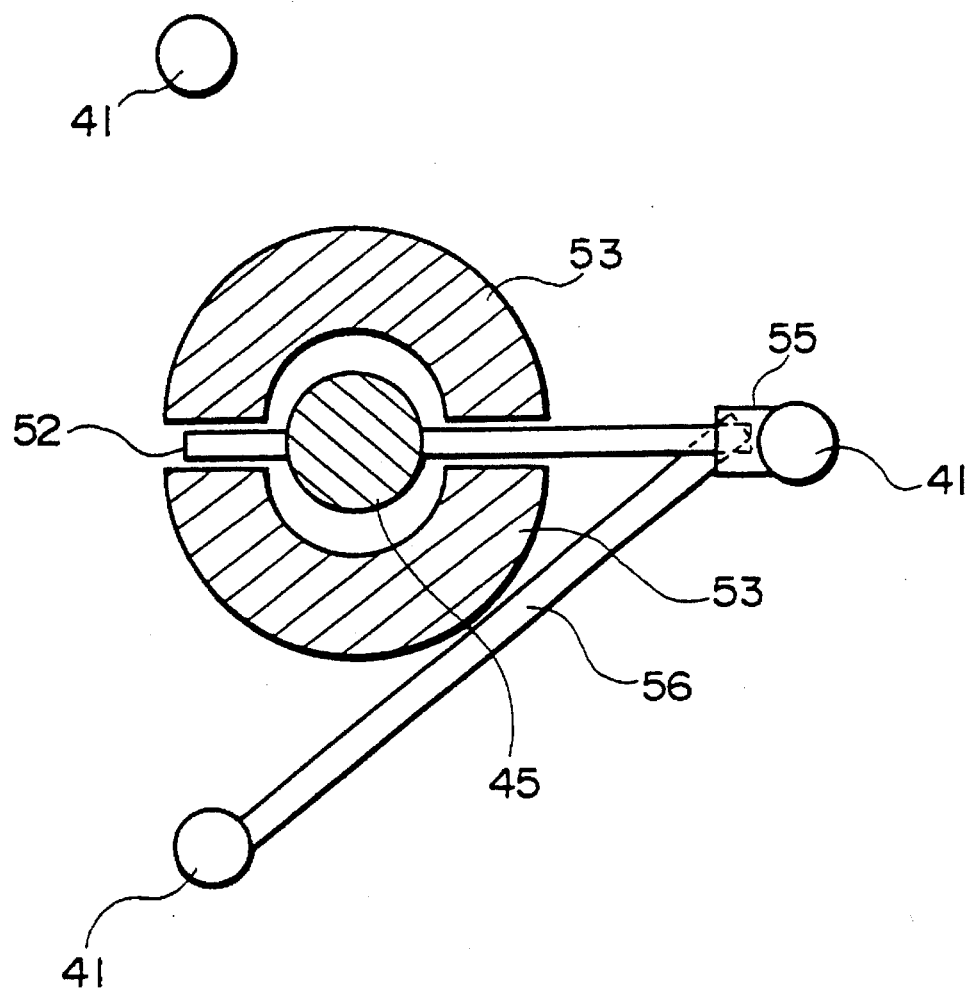
FIG. 2 is a schematic plane view explaining the antirotation arrangement of piston holder in FIG. 1.

As shown in FIG. 2, antirotation pin 52 is provided horizontally on the side of piston holder 45 and antirotation cylinder 53 is provided uprightly on unit base board 7. Antirotation cylinder 53 is composed by a couple of half cylinder facing each other with a gap. Antirotation pin 52 is placed in one side of the gap. Therefore, it can not happen that piston holder 45 might rotate according to rotation of slave threaded cylinder 44, because antirotation pin 52 is caught to restrain the rotation. In the other side of the gap, sensing blade 54 is placed to be sensed by origin sensor 55 and overrun sensor 56.

By the antirotation structure as described, the rotation motion of rotation cylinder 43 is transformed to a linear up-and-down motion, which is transferred with piston 5. Motor 31 is initially driven to an orientation which enables piston 5 to move downward and is stopped when piston 5 reaches at a lower marginal position.

As piston 5 moves downward, piston head 51 dipped in liquid crystal advances from storing part 621 toward ejecting part 622. And then, piston head 51 is confined into ejecting part 622, thus pressing liquid crystal out of ejecting part 622. This results in that the end of capillary 63 releases one drop of liquid crystal. Released liquid crystal has been heated because it is necessary to lower its viscosity in order to make the filling easier.

After the period necessary for one drop release, control device sends a signal for a reversal motion, resulting in that motor 31 is driven in reverse to let piston 5 move upward and is stopped when piston 5 reaches at the initial upper marginal position. As piston 5 moves upward, piston head 51 rises out of ejecting part 622 and get back at the initial position.

Figure 3:
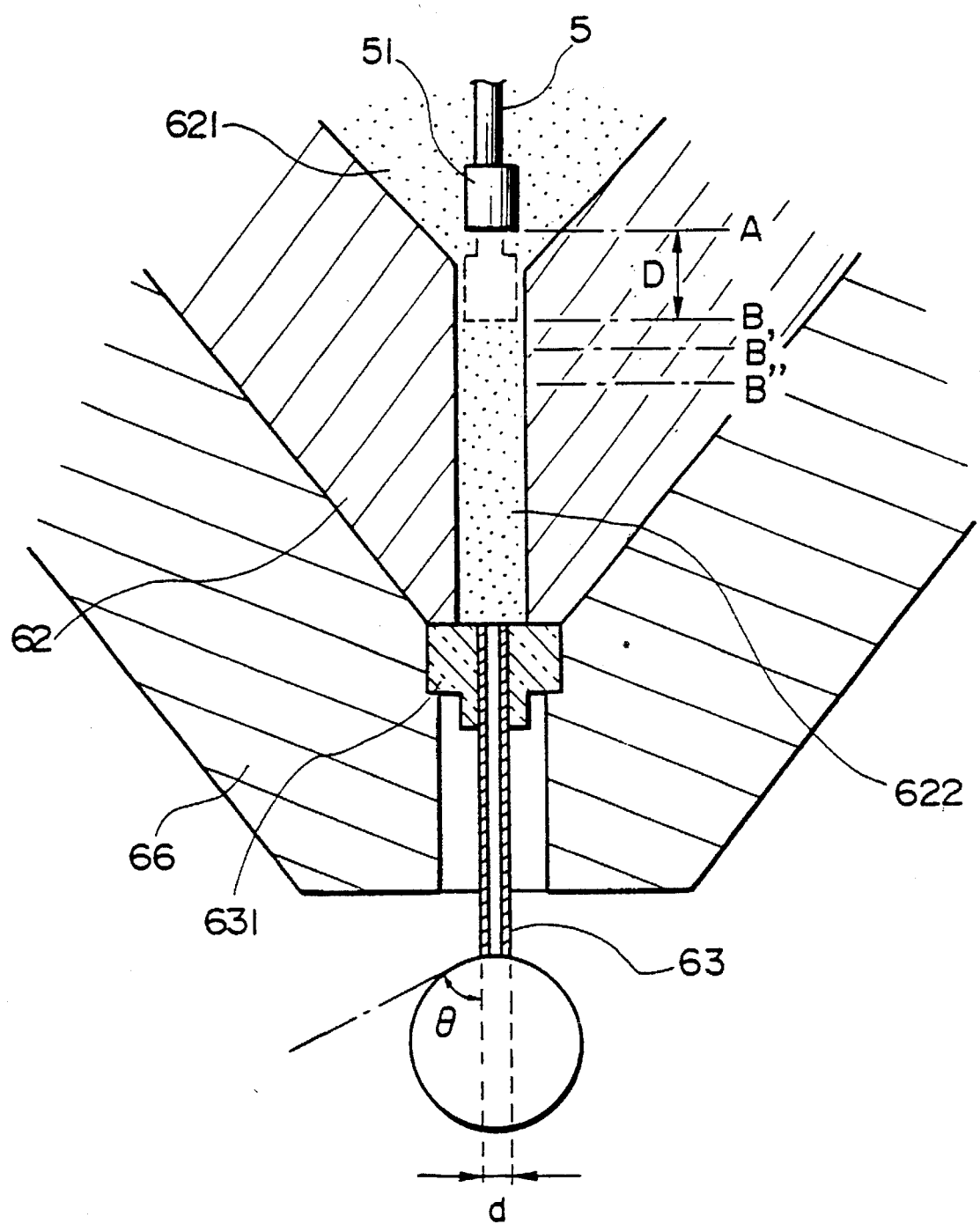
FIG. 3 is a partial cross-sectional view explaining the motion of piston in FIG. 1.

Most reliable control on the dropping operation is to release one drop with one up-and-down stroke (inter A and B in FIG. 3) of piston 5. Confinement depth D is predetermined according to viscosity of liquid crystal and other factors so that one drop can be released with one stroke of piston 5. Of course, it is employable to release two or more drops with one stroke by enlarging the stroke length such as inter A and B' or A and B", that is, enlarging confinement depth D. In this case, desired confinement depth D for the desired drop number should be estimated experimentally in advance and the number of stroke necessary for a desired amount of liquid crystal is predetermined. Furthermore, it is also possible to control the stroke step by step. That is, it is possible to stop piston 5 when piston 5 reaches at B to release the first drop, move down again and stop piston 5 when piston 5 reaches at B' to release the second drop, and move down again and stop piston 5 when piston 5 reaches at B" to release the third drop. Confinement depth D among these operations is controlled by, for example, the step number of a stepping motor as motor 31.

Now, small air bubbles can generate in vessel 62 when the operation of liquid crystal dispenser as described is carried out at an evacuated atmosphere. This bubble generation mainly results from rapid evaporation of liquid crystal, which is caused by the contact with the evacuated atmosphere. It also can be a cause that air is mixed into liquid crystal when liquid crystal is poured into vessel 62 if poring is done at the normal atmospheric pressure. In this case, mixed air forms small bubbles adhering on the interior wall of vessel 62 or entering into the gap between vessel 62 and vessel holding board 61. Anyway, these air bubbles move inside the vessel 62, being influenced by the evacuated atmosphere.

If vessel 62 has no opening except for the opening connected with capillary 63 as well as in conventional dispensers for other use, air bubbles must move toward capillary 63, and consequently pass through capillary and are released from the end. Such bubble release from the capillary end makes the operation control impossible, because the liquid quantity of each drop may change, or worse, a drop can not be released at a stroke.

In the invention, however, vessel 62 has upper opening 620 through which inside liquid crystal gets in contact with the evacuated atmosphere. Therefore, air bubbles in liquid crystal can be released out through the liquid surface, not through capillary 63. So, the liquid dispenser of the invention can control an amount of released liquid crystal sufficiently even if it is used at an evacuated atmosphere.

Figure 4:
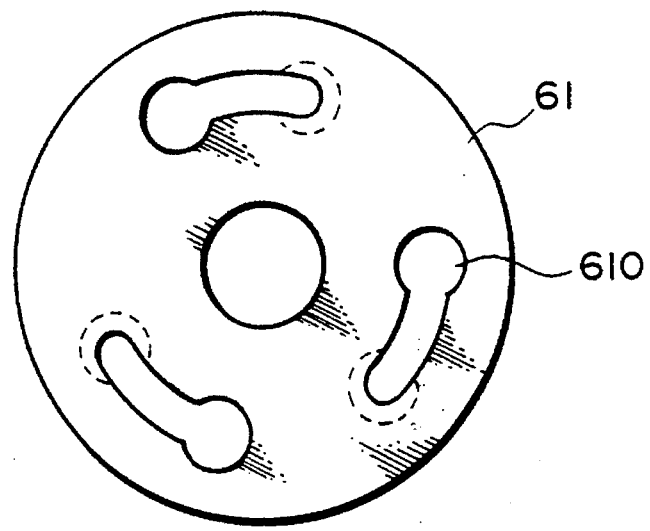
FIG. 4 is a schematic view on plane A—A in FIG. 1 explaining the fitting structure of vessel holder.

Next is deserved the structure for substitution of capillary 63. Capillary 63 is substituted by removing capillary unit 6 from unit base board 7 and fitting another capillary unit. As shown in FIG. 4, three through-hole 610 are formed concentrically with vessel holding board 61. Each through-hole 610 is shaped with a comparatively-large circle part and a circular arc part. Vessel holding board 61 can be removed from unit base board 7 by turning vessel holding board 61 a little, setting the large circle part of through-hole 610 at the head of board fitting pin 611 and pulling down vessel holding board 61. Of course, fitting of capillary unit 6 can be done by the inverted order. As described, this dispenser has the structure where capillary unit 6 can be removed or fitted by "one-touch", which makes substitution of capillary 63 much easier.

Figure 5:
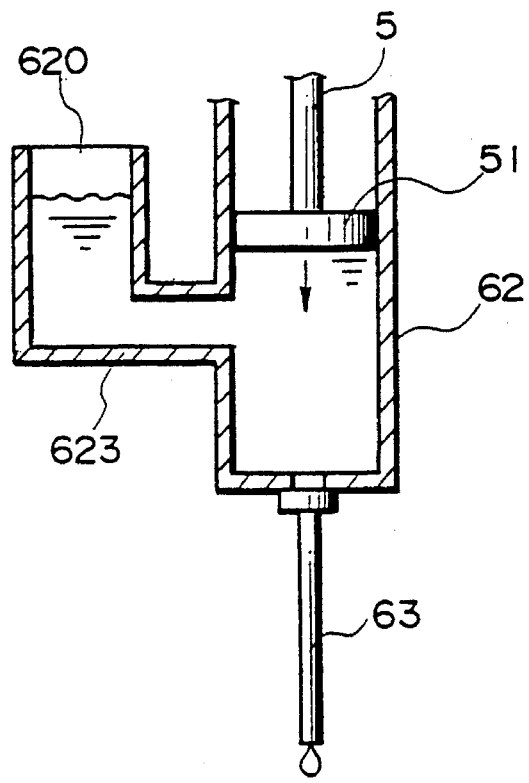
FIG. 5 schematically shows a liquid crystal dispenser as another embodiment of the invention.

The following is a description of another embodiment of the liquid crystal dispenser, which is shown in FIG. 5. The liquid crystal dispenser in FIG. 5 comprises cylinder-shaped vessel 62, piston 5 that moves up-and-down inside vessel 62, capillary 63 provided at the bottom end of vessel 62. And, extra vessel 623 is equipped, neighboring and connecting with vessel 62. Extra vessel 623 has upper opening 623 through which liquid crystal inside vessel 62 can get in contact with the evacuated atmosphere.

The liquid crystal dispenser in FIG. 5 is operated as follows. Setting piston 5 at backed position, liquid crystal is poured through upper opening 620 and stored vessel 62 and extra vessel 623. Liquid crystal is released by drops or flowingly as piston 5 is pressed down. Though air bubbles are formed in this liquid crystal dispenser, almost all bubbles are released through upper opening 620. Therefore, it can not happen that the release amount control gets impossible by the air bubble emission from the capillary end. The release amount control can be executed by a stroke length and times of piston 5 as well as the former embodiment.

Next, two embodiment of liquid crystal filling method of the invention is described as follows. The first embodiment is one where an assembling step of LCD cell is the same as in the conventional way and a filling step is different. The second embodiment is one where all steps are different with the conventional way.

Figure 6:
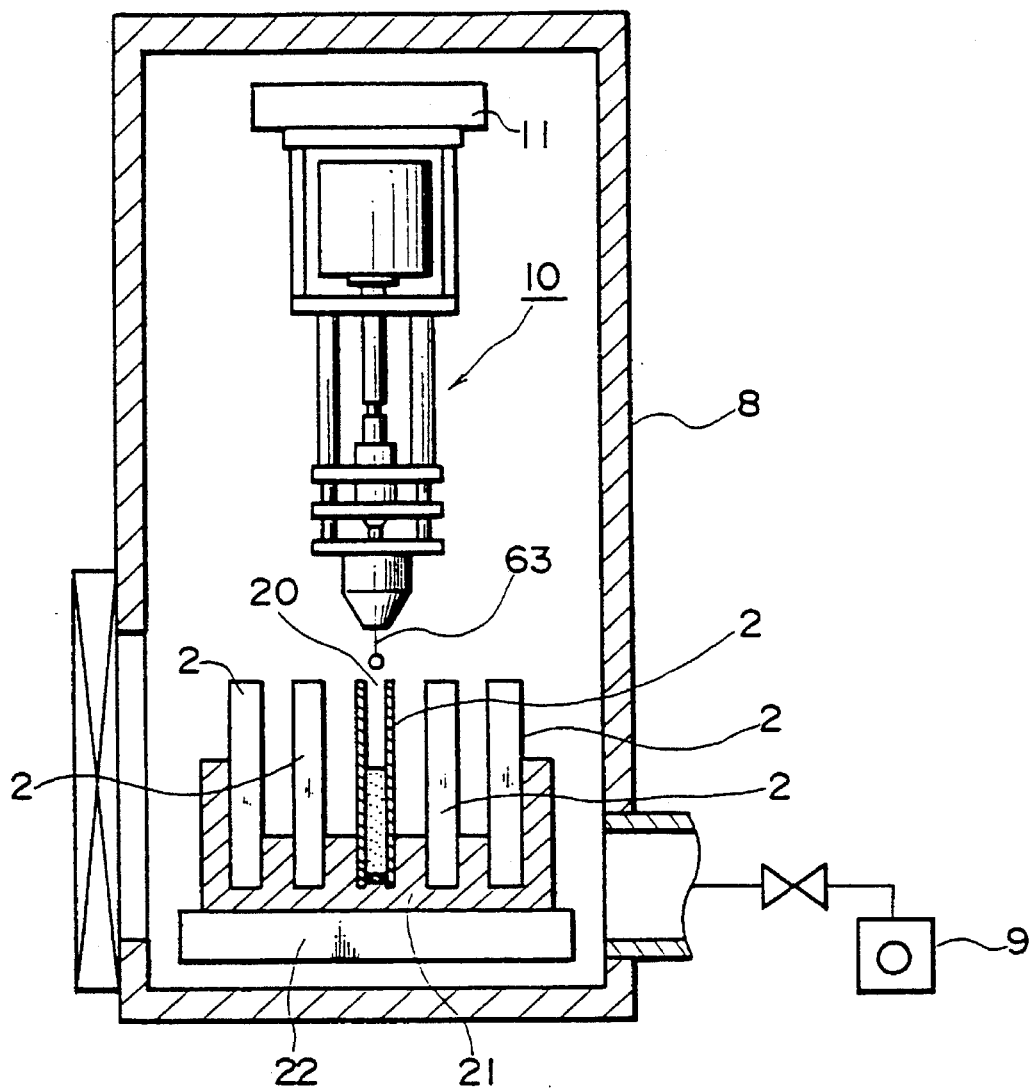
FIG. 6 explains the first embodiment of the liquid crystal filling method of the invention.

Following description of the first embodiment omits other steps than the filling step because those are not essentially different with the conventional way. Though a practical filling step is carried out through a series of apparatuses equipped along a cell transfer line, FIG. 6 shows only a liquid crystal filling apparatus schematically. The apparatus in FIG. 6 comprises vacuum chamber 8, vacuum pump 9 evacuating vacuum chamber 8, table 22 on which cassette 21 for setting several pieces of LCD cell 2 with is placed, liquid crystal dispenser 10, as described before, provided over table 22 and level moving mechanism 11 for moving table 22 at a level.

LCD cell 2 is assembled by the same way as in conventional fabrications. Several pieces of LCD cell 2 are set with cassette 21 and cassette 21 is placed and fixed on table 22. Each LCD cell 2 is in an upright posture with its inlet 20 directed up. Cassette 21 with LCD cells 2 is loaded into vacuum chamber 8, and placed and fixed on table 22. One of LCD cells 2 is just under and close to the capillary of liquid crystal dispenser 10. At this situation, vacuum pump 9 is started to operate, and consequently vacuum chamber 8 is evacuated up to about 0.1 Torr or below. And then, liquid crystal dispenser 10 is operated to release liquid crystal by drops and fill it into LCD cell 2 through inlet 20. In this operation, the drop number of liquid crystal is predetermined so as to fill a desired amount because the quantity of one drop can be controlled in order of milligram. The control device of liquid crystal dispenser 10 sends the motor a signal so as to drive the piston just at the predetermined stroke and times. After filling into one LCD cell 2 is finished, level moving mechanism 11 is driven to move table 22 and place another LCD cell 2 at the position just under liquid crystal dispenser 10. And, the same filling operation is repeated.

After completing of filling into all LCD cells 2 in cassette 21, cassette 21 is unloaded from vacuum chamber 8 and transferred to the inlet sealing step. In this liquid filling method described above, though there is a case that released liquid crystal is filled directly into LCD cell 2, usually in practical methods, released liquid crystal is temporarily collected covering inlet 20, and by exposing LCD cell 2 to the normal atmospheric pressure liquid crystal is filled into LCD cell 2. In the liquid crystal filling apparatus of FIG. 6, level moving mechanism 11 may be equipped not with table 22 but with liquid crystal dispenser 10 so that the capillary can be moved to the position just above the next LCD cell 2.

Next is described the filling amount control by setting an outer diameter of capillary. Concerning to the quantity of liquid swelling out form the capillary end, it is known that there exists the relation as follows.

$$m g = \pi d \nu \cos \theta$$

In the above relation, m is as mass of the swelling liquid, g the as gravitational acceleration, d as an outer diameter of capillary, ν as surface tension of liquid, θ as an angle of the tangential line on the swell and the normal line on the edge surface, respectively. In those factor, g, ν, and θ all can be regarded constant. Therefore, m depends only on d, that is, m can be controlled by selecting an appropriate d. Practically, m of liquid crystal to be filled is calculated by knowing those values preliminarily and substituting them for the above formula. And, the drop number is determined from calculated m, according to a amount mass of liquid crystal to be filled. The drop number is used for the stroke control of piston, as describe before. In this control, smaller quantity of the drop can makes the controllability higher. But, that expands the filling time. So, d should be determined taking those loss and gain into consideration.

Clearly from the description, Liquid crystal filling method of the embodiment has a lot of merits, compared with conventional ways. First, cost reduction is enabled because liquid crystal can be used up completely. Secondly, degradation liquid crystal is hardly caused because area of the liquid surface got in contact with an evacuated atmosphere is so much narrower than conventional methods. Thirdly, a filling amount can be controlled with high accuracy by selecting a capillary having an appropriate outer diameter.

The filling amount control is still able to be done by other ways than calculation as described. For example, it also enables us to control a filling amount, to know the quantity of one drop experimentally at a certain condition and release at the same condition.

Furthermore, liquid crystal filling can be carried out not only by drops but flowingly. Even flowing filling has merits reducing the waste and preventing the degradation of liquid crystal.

Figure 7:
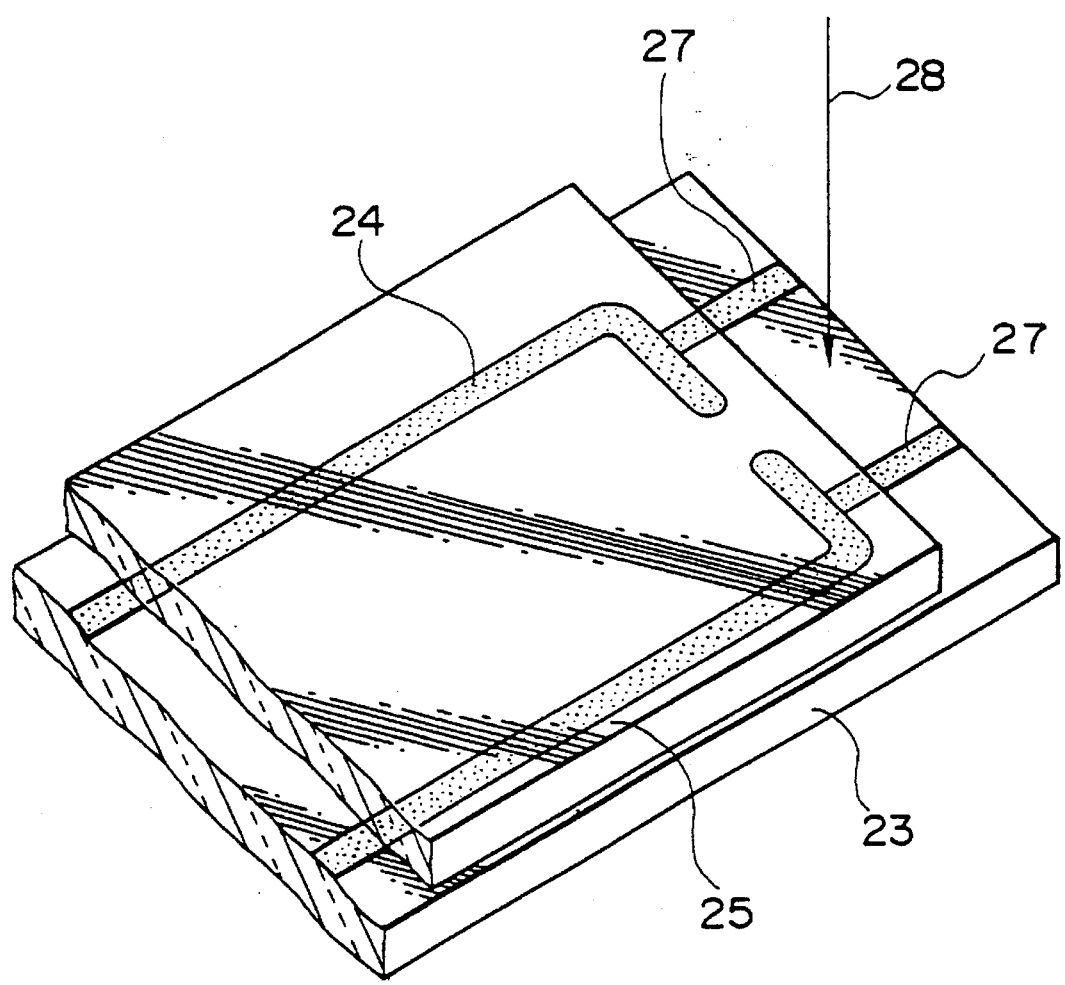
FIG. 7 shows a preferred mode in the first embodiment of the liquid crystal filling method.

And, a LCD cell may be sustained at an inclined posture. FIG. 7 shows a preferred mode in this case. Because lower substrate 23 of LCD cell in FIG. 7 is a little longer than upper substrate 25, a step is shaped at the marginal part where inlet 20 is formed. Released liquid crystal is temporarily collected at this step prior to filling. To incline the LCD cell having such a configuration as this is effective to enlarge the collecting space for efficiency. In this case, it is more preferable to provide barrages 27 at both sides of the filling pass so that released liquid crystal might not flow over. Barrages 27 can be formed of photocuring resin as same as substrate adhering paste 24. Otherwise, a certain jig able to block the overflow can be used as barrage 27.

Figure 10:
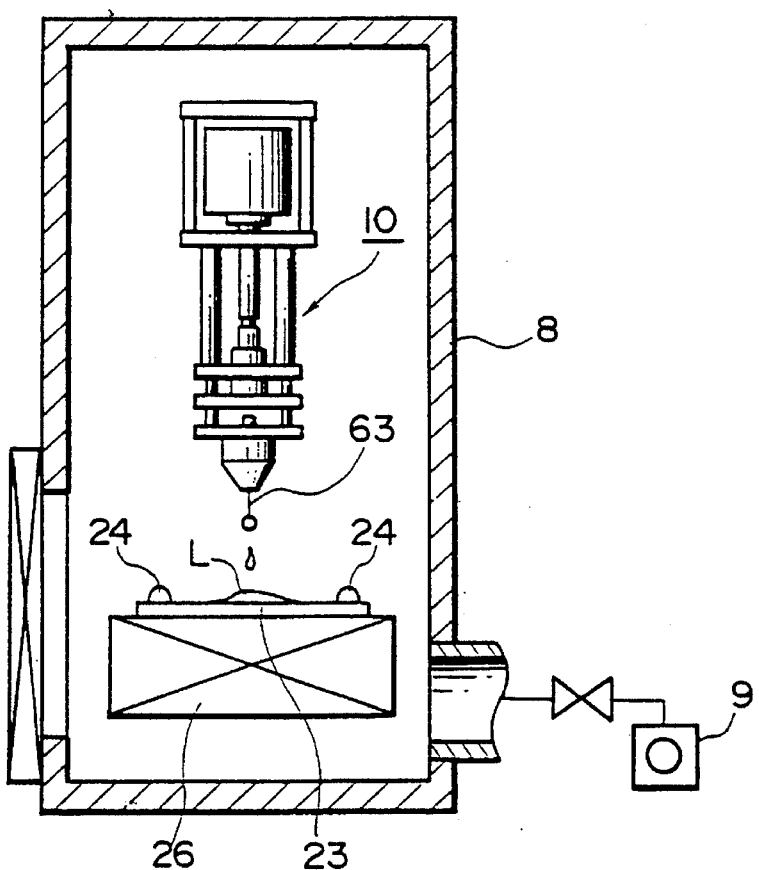
FIG. 10 is a schematic view of a liquid crystal filling apparatus used for dropping of liquid crystal at the step of FIG. 7(b).
Figure 11:
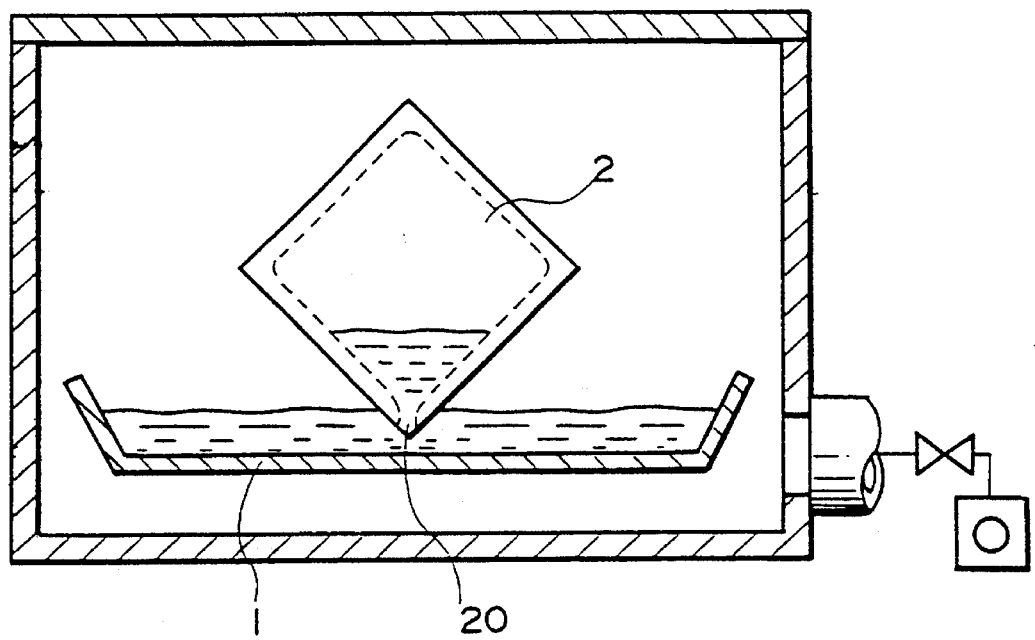
FIG. 11 explains a conventional way for filling liquid crystal into a LCD cell.

The second embodiment of liquid crystal filling method of the invention is explained by FIG. 8 and FIG. 9. At first, substrate adhering paste 24 composed of photocuring resin is applied on lower substrate 23 along its margin (FIG. 8(a)). Next, a desired amount of liquid crystal L is dropped down onto the surface of lower substrate 23 inside the loop of applied substrate adhering paste 24. Liquid crystal is dropped at some different points. As shown in FIG. 10, each dropping point has an equal interval so that dropped liquid crystal can spread uniformly (FIG. 8(b)). Then, upper substrate 25 is laminated on lower substrate 23 and substrate adhering paste 24 is cured by the light form lamp 7 to adhere upper substrate 25 with lower substrate 23 (FIG. 8(c)). Through these steps, the LCD cell is filled with a desired amount of liquid crystal.

The apparatus used for the liquid crystal dropping at the step of FIG. 8(b) is schematically shown in FIG. 9. The liquid crystal dropping apparatus of FIG. 9 is composed mainly by vacuum chamber 8, vacuum pump 9 for evacuating the inside of vacuum chamber 8, X-Y moving table 26 provided in vacuum chamber 8, and liquid crystal dispenser 10 equipped above X-Y moving table 26. Clearly from FIG. 9, this apparatus dose not use a cell cassette, and lower substrate 23 on which substrate adhering paste is applied is loaded into vacuum chamber 8 piece by piece. After loaded lower substrate 23 is placed and fixed on X-Y moving table 26, vacuum pump 9 is started to evacuated the inside of vacuum chamber 8 up to about 0.1 Torr. And then, liquid crystal dispenser 10 is operated to release liquid crystal drop by drop. During the dropping operation, X-Y moving table 26 is driven to move lower substrate 23 at a predetermined interval toward a predetermined direction after every one drop reaches at the lower substrate 23, in order to set the next dropping point just under liquid crystal dispenser 10.

In this specification, "upper substrate" and "lower substrate" do not mean the substrate being upper and the substrate being lower at practical use of LCD, respectively. And, a practical production line often has a apparatus which can carry out not only a filling step but also a paste applying step or other steps. Therefore, a paste dispenser or other equipment can be provided in vacuum chamber 8 as well as liquid crystal dispenser 10. In this case, X–Y moving table 26 in FIG. 10 can be in a combination use for liquid crystal filling and paste applying.

The liquid crystal filling method of the second embodiment described above can contribute greatly to productivity improvement because the time necessary for filling is so much reduced, compared with conventional ways using the capillary phenomenon. The method of this embodiment essentially do not have to be executed at an evacuated atmosphere because it dose not use the capillary phenomenon. But, operation at an evacuated atmosphere is effective on filling the LCD cell with liquid crystal without any gaps and has a merit on preventing the degradation which is caused by contaminants mixed into liquid crystal.

What is claimed is:

1. A method for filling liquid crystal into a LCD cell comprising: providing a capillary-type liquid crystal dispenser adapted to be operated at an evacuated atmosphere, placing a lower substrate horizontally at an evacuated atmosphere, releasing a predetermined amount of liquid crystal from the dispenser onto a lower substrate, laminating an upper substrate of the LCD cell onto the lower substrate thereafter, and sealing the margins defined by the edges of the upper and lower substrates.

2. A liquid crystal filling method as claimed in claim 1, where the capillary-type liquid crystal dispenser is able to release liquid crystal drop by drop and able to control the quantity of one drop, and control of the filling amount control is performed by the number of drops.

3. A liquid crystal filling method in claim 2, where the quantity of one drop is controlled by selecting the outer diameter of the capillary end of the capillary-type liquid crystal dispenser.

* * * * *

UNITED STATES PATENT AND TRADEMARK OFFICE
CERTIFICATE OF CORRECTION

PATENT NO. : 5,511,591
DATED : April 30, 1996
INVENTOR(S) : Taizo ABE

It is certified that error appears in the above-indentified patent and that said Letters Patent is hereby corrected as shown below:

On the Title Page, item [73], the Assignee is incorrect, delete "Fujitsu Limited, Kawasaki Japan" and add therefore, --Ayumi Industry Co., LTD, Himeji-shi, Japan--.

Signed and Sealed this

Second Day of September, 1997

Attest:

BRUCE LEHMAN

*Attesting Officer*       *Commissioner of Patents and Trademarks*